United States Patent [19]

Nagai

[11] Patent Number: 4,500,286
[45] Date of Patent: Feb. 19, 1985

[54] PRIMARY AIR SUPPLY UNIT OF ROTARY KILN

[75] Inventor: Hiroshi Nagai, Kanagawa, Japan

[73] Assignees: Nippon Furnace Kogyo Co., Ltd.; Chichibu Cement Co. Ltd., both of Tokyo, Japan

[21] Appl. No.: 507,186

[22] Filed: Jun. 23, 1983

[30] Foreign Application Priority Data

Jul. 29, 1982 [JP] Japan .................. 57-131109
Aug. 26, 1982 [JP] Japan .................. 57-146949

[51] Int. Cl.³ .................. F27B 7/02; F27D 15/02
[52] U.S. Cl. .................. 432/106; 432/83
[58] Field of Search .................. 432/78, 80, 83, 84, 432/105, 106

[56] References Cited

U.S. PATENT DOCUMENTS 1,690,048 10/1928 Bentley .................. 432/80
2,103,170 12/1937 Newhouse et al. .................. 432/80

Primary Examiner—John J. Camby
Attorney, Agent, or Firm—Beveridge, DeGrandi and Kline

[57] ABSTRACT

In a primary air supply unit of a rotary kiln, an improved method for reducing a primary air rate by providing a high-pressure blower for primary air to inject the primary air from a burner together with fuel. In addition, in order to preheat the primary air and to protect any fragile portions in a clinker box for cooling sintered material from the rotary kiln and for preheating the primary air.

6 Claims, 7 Drawing Figures

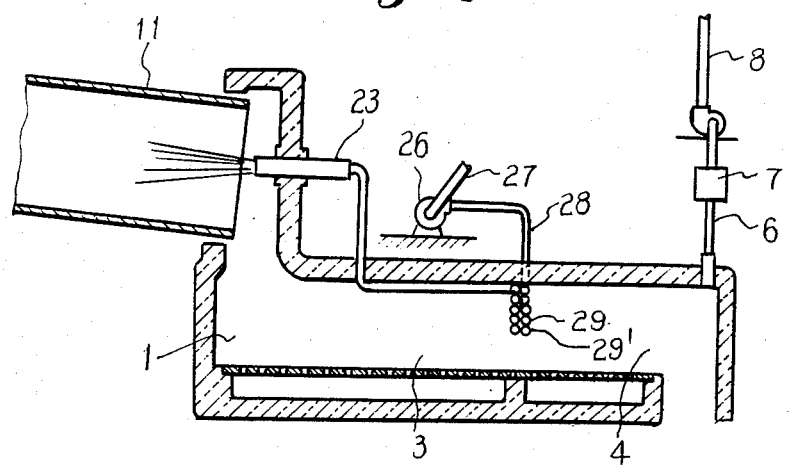
_Fig. 5._
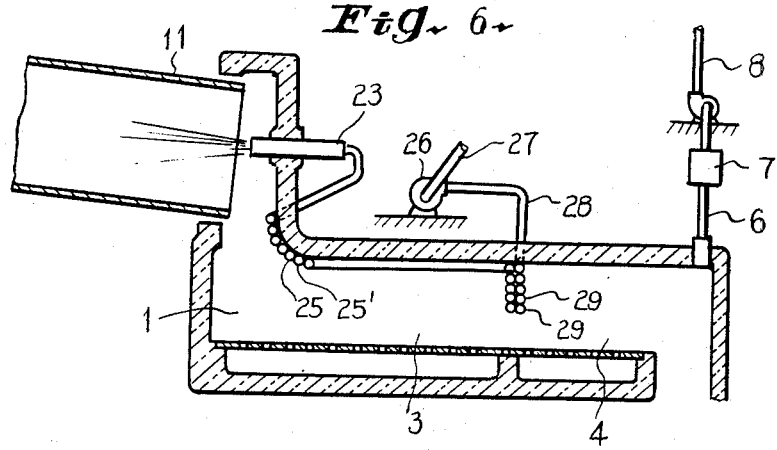
_Fig. 6._
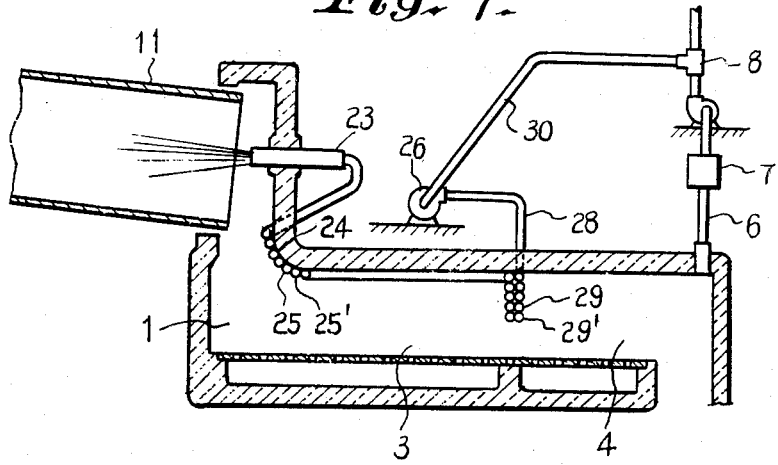
_Fig. 7._

PRIMARY AIR SUPPLY UNIT OF ROTARY KILN

BACKGROUND OF THE INVENTION

The present invention relates in general to an apparatus for improving combustion efficiency of a rotary kiln. For example, a rotary kiln for sintering cement is provided with a burner or burners for heavy oil, pulverized coal or for both of them at the fore end thereof to allow fuel to inject into the rotary kiln.

If the primary air is supplied after it is preheated to a high temperature and under a high pressure, any fuel is smoothly ignited and burned. Secondary, air is supplied to a clinker box as cooling air and is in contact with clinker in the clinker box, thus the said cooling air is elevated to a high temperature near 1000° C.; this high temperature air is allowed to be supplied from the periphery of the said burner.

If the primary air is excessive, the secondary air is inevitably reduced. As a result, the latter is further preheated by the clinker, which will damage the clinker box as well as decrease the overall combustion efficiency.

The present invention is therefore, how to reduce a primary air rate and how to prevent the clinker box from damage.

SUMMARY OF THE INVENTION

It is therefore a primary object of this invention to provide a unique and useful primary air supply unit for improving combustion efficiency by reducing a primary air rate.

It is another object of this invention to prevent a clinker box from damage and to preheat primary air by mounting several groups of tubes for preheating primary air on any fragile section in the said clinker box.

The foregoing objects, characteristics, principles, details and advantages will become apparent from the following detailed description with respect to preferred embodiments of this invention, when read in conjunction with the accompanying drawing figures in which like parts are designated with like numerals.

BRIEF DESCRIPTION OF THE DRAWINGS

In the drawing:

FIGS. 5 and 6 are explanatory views of other primary air supply units relating to this basic invention.

FIG. 7 is an explanatory view of a primary air supply unit of a rotary kiln for sintering cement relating to a second invention relating to the basic invention.

DETAILED DESCRIPTION OF THE INVENTION

The present invention is based on the operating principle which will now fully described hereinafter.

A rotary kiln such as one for sintering cement allows to inject fuel into the rotary kiln by providing a burner or burners for heavy oil, for pulverized coal or for both of them at the fore end thereof. Simultaneously, high pressure primary air is also allowed to inject fuel, and if this primary air is supplied after preheated to a high temperature at a high pressure, fuel is smoothly ignited and burned. Secondary air is supplied into a clinker box as cooling air, is in contact with clinker in the clinker box, and the said cooling air is elevated to a high temperature near 1000° C.; this air elevated to such a high temperature is allowed to be supplied from the periphery of the said burner as secondary air.

This invention relates to a primary air supply unit delivering primary air to a burner or burners to be installed at the fore end of a rotary kiln.

Clinker sintered in a rotary kiln is sent into a clinker box provided at the fore end of the rotary kiln and is cooled rapidly in the said clinker box. For example, cement clinker is fast cooled by sending a large air rate into the said clinker box. Unless the clinker is cooled rapidly, the clinker sintered with much effort is returned to the original status.

Figure 1:
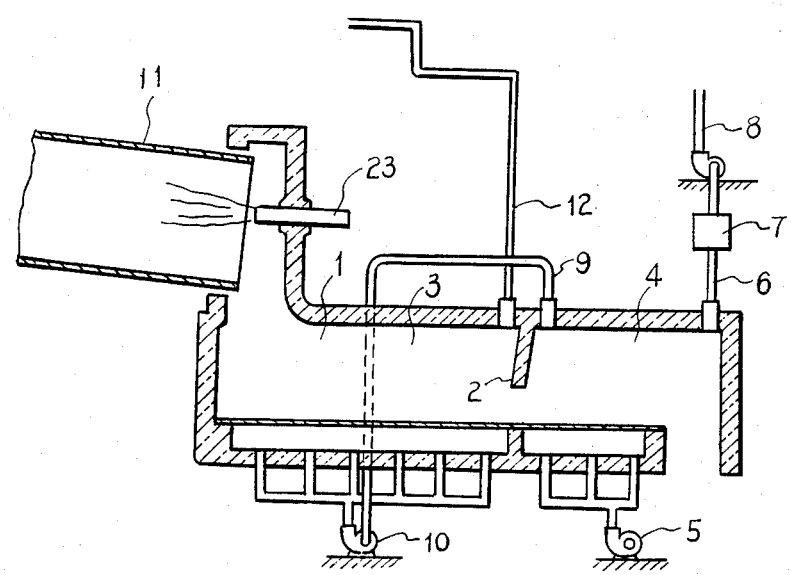
FIG. 1 is an explanatory view showing a cooling device of clinker in a clinker box of a rotary kiln for sintering cement.
Figure 2:
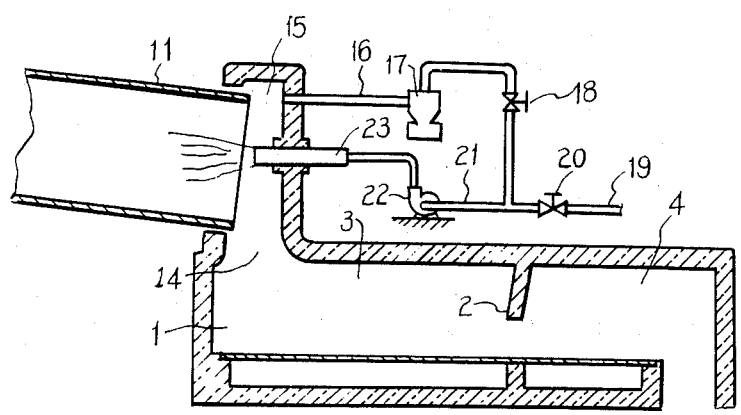
FIG. 2 is an explanatory view of a conventional primary air supply unit of a rotary kiln for sintering cement.

Therefore, clinker box 1 is divided into high temperature chamber 3 and low temperature chamber 4 by providing partition wall 2 made of refractory hung down from the ceiling of clinker box 1 as given in FIG. 1, and cooling air is first supplied from the bottom of low temperature chamber 4 by blower 5. A part of this cooling air is drawn out from the ceiling of the said low temperature chamber 4 through drawing out pipe 6 as shown in FIG. 1; the air still at a high temperature about 200° C. after dust is removed from it by electric precipitator 7 is utilized for power generation as an example through supply pipe 8 with a blower. The other part of the air is sucked from the ceiling of the said low temperature chamber 4 through suction pipe 9, which is the suction pipe of blower 10, and is supplied to high temperature chamber 3 from the bottom of high temperature chamber 3 by blower 10. A part of the air elevated to a high temperature from 800° C. up to 1000° C. with the heated clinker in the said high temperature chamber 3 is supplied from the periphery of burner 23 into rotary kiln 11 as secondary air. The other part of the excess air is sent to an auxiliary furnace for helping combustion which is a previous process before rotary kiln 11. FIG. 2 shows an embodiment of a high pressure air supply unit sending primary air to burner 23 for conventional rotary kiln 11. In FIG. 2, drawing out pipe 16 is fitted to upper space 15 of entrance 14 of clinker box, cyclone 17 is provided for separating dust from the said drawing out pipe 16, regulating valve 18 is mounted on the exit pipe of cyclone 17, regulating valve 20 is mounted on atmosphere intake pipe 19, mixed gas with a suitable ratio between high temperature gas from the said drawing out pipe 16 and the atmosphere is supplied to blower 22 for primary air through suction pipe 21. Primary air forced to a high pressure by blower 22 for primary air is supplied to burner 23. In the conventional primary air supply unit shown in FIG. 2, a primary air temperature is 200° C. through 300° C.; thus, a blower for such primary air can not be rotated at a very high speed, therefore, a primary air pressure is from 200 to 300 mm in water column, and primary air was required for 25 to 30 percent of all air quantity to burn fuel injected from the said burner 23. Thus, conventional blower 22 for primary air required an extremely large capacity. Further, fine powder which can not be separated perfectly by a cyclone unit 17 is mixed in primary air; in addition, it was dangerous to allow the said blower 22 for primary to operate at a high revolving speed because the primary air is considerably at a high temperature under a high pressure; thus, fine powder might be adhered to the vanes of the blower and further abrasion of the vanes and/or the casing is also considerably severe, thus, it was disadvantage that life of any such blower was short.

Figure 3:
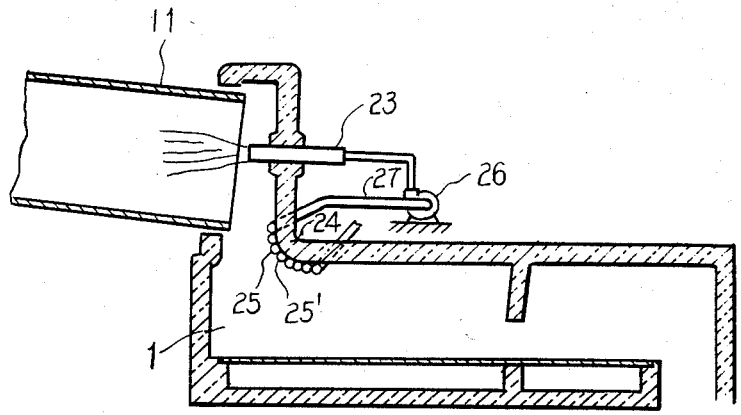
FIG. 3 is an explanatory view of a primary air supply unit previously experimented by the inventor according to this invention.

FIG. 3 indicates a primary air supply unit of a rotary kiln. In FIG. 3, since fore end corner 24 of the coiling of clinker box 1 is exposed to an extremely high temperature and the refractory construction in this portion is in contact with clinker at high temperatures resulting in a chemical reaction, the inventor has covered corner portion 24 at the fore end of the said ceiling with heating tube groups 25, 25' . . . for preheating primary air and allowed the said heating tube group to connect with suction pipe 27 of blower 26 for primary air. In this case, it was required that an obtainable air temperature was as low as 100° C. or less, and a primary air rate was required to be about 10 percent of total combustion air rate even if a primary air pressure was increased as high as from 1000 to 2000 mm water column; thus, a secondary air rate was 90 percent of the total combustion air rate.

This basic invention relates to a primary air supply unit further capable of reducing a primary air rate as comared with the experimental shown in FIG. 3, can allow to decrease a blower capacity, fuel ignition and combustion be made smoothly and a fuel consumption rate be also reduced.

Figure 4:
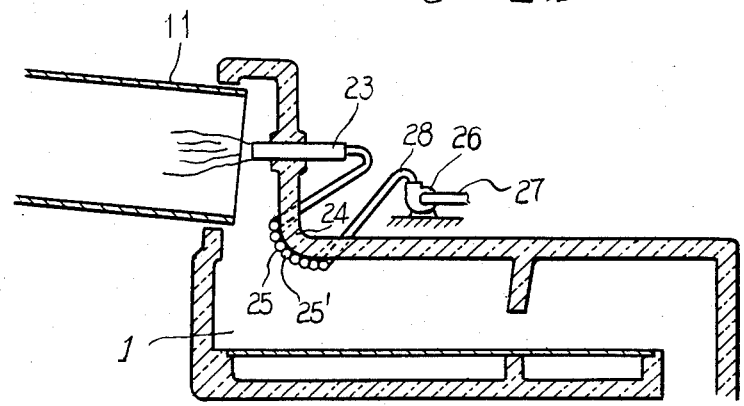
FIG. 4 is an explanatory view of a primary air supply of a rotary kiln for sintering cement, relating to this basic invention.

The primary air supply unit of this basic invention will be explained in accordance with FIG. 4 showing an embodiment thereof. In FIG. 4, high pressure primary air injected together with fuel from burner 23 of rotary kiln 11 is pressurized by blower 26 for primary air, delivery pipe 28 thereof is connected with heating tube groups 25, 25' . . . for preheating primary air mounted on corner refractory structure 24 at the fore end of the ceiling of clinker box 1, thus, high pressure primary air is heated while passing through the said heating tube groups 25, 25' . . . is carried to burner 23 with a pressure thereof being kept and is forcibly injected from burner 23 together with fuel. In this case, a temperature of the primary air supplied to burner 23 is 500° through 800° C., a pressure thereof is from 1000 to 2000 mm in water column and a primary air rate can be reduced to 2 percent of a required total combustion air rate. Therefore, a high temperature secondary air rate supplied to rotary kiln 11 through clinker box becomes 98 percent of the required total combustion air rate. Fuel is finely minuted with the primary air at a high pressure under a high temperature and is smoothly ignited and burned by supplying the secondary air at a high temperature. Consequently, when the primary air supply unit according to this invention is used, fuel consumption can be reduced by about 2 percent than before, and especially when pulverized coal is used as fuel, it can smoothly be burned; a blower for primary air requiring high pressure performance can be of a small capacity, abrasion thereof be decreased, thus, it is possible to use the blower for a long time.

Further, corner refractory structure 24 at the fore end of the ceiling of clinker box 1 was conventionally damaged by burning severely, however, a degree of the damage due to burning can be greatly reduced by covering this corner refractory structure with heating tube groups 25, 25' . . . for preheating primary air.

Incidentally, for sintering cement or like, it has been clarified that good quality cement can not be obtained unless clinker produced with much effort by sintering it in a rotary kiln in cooled rapidly. Therefore, it has been intended that conventional clinker box 1 has been provided with partition wall 2 at an upper position between high temperature chamber 3 and low temperature chamber 4 to cool clinker fast and to supply high temperature air. However, partition wall 2 with refractory construction installed by hanging down from the ceiling of clinker box 1 is seriously damaged because it is exposed to extremely high temperatures and some chemical reaction is carried out by direct contact with clinker at high temperatures.

The other two embodiments of this basic invention are shown in FIGS. 5 and 6. In FIG. 5, high pressure primary air injected from burner 23 of rotary kiln 11 together with fuel is further pressurized by blower 26 for primary air. Heating tube groups 29, 29' . . . for preheating primary air are mounted on a position in a clinker box 1 where partition wall 2 (see FIG. 2) was conventionally installed. Delivery pipe 28 of blower 26 for primary air is connected with these heating tube groups 29, 29' . . . , thus the high pressure primary air is heated through the said heating tube groups 29, 29' . . . , is carried to burner 23 while the pressure thereof is maintained, and is forcibly injected from burner 23 together with fuel.

In FIG. 6, high pressure primary air being injected from burner 23 of rotary kiln 11 is further pressurized by blower 26 for primary air is carried to burner 23 after heated through heating tube groups 29, 29' . . . at a position where the partition wall was conventionally installed and further through heating tube groups 25, 25' . . . for preheating primary air mounted on corner 24 at the fore end of the ceiling of clinker box 1, and is forcibly injected from burner 23 together with fuel.

These primary air supply units in FIGS. 5 and 6 can greatly reduce burning of heating tube groups 29, 29' . . . which replaced conventional partition wall 2 (see FIG. 1 or 2) installed at a nearly same location; with this, can supply high temperature secondary air to rotary kiln 11 by adequate quantity and can produce good quality cement.

An embodiment of a second invention relating to this invention is given in FIG. 7. As already explained with FIG. 1, clinker box 1 is partitioned to high temperature chamber 3 and low temperature chamber by refractory wall 2 hung down from the ceiling of clinker box 1, a part of large quantity air supplied from blower 5 to the said low temperature chamber is drawn out through drawing out pipe 6, intake port of which is fitted through the ceiling of the said low temperature chamber, and is supplied to another utilization field through air supply pipe 8 with a blower after dust is removed from the air by electric precipitator 7 installed on drawing out pipe 6. With a branch provided for the said air supply pipe, suction pipe 30 of blower 26 for primary air is allowed to connect with the said branch. Therefore, the said blower 26 sucks air at about 200° C., pressurized and delivers the air. Since the air supplied from the blower 26 for primary air has already passed electric precipitator 7 includes less dust and can be pressurized by operating blower 26 at a high rotary speed, if a temperature thereof is about 200° C.; no substantial vibration might occur with dust adhere to the vanes of blower 26.

This second invention can additionally improve the thermal efficiency a little than the basic invention can do so.

As stated in DETAILED DESCRIPTION OF THE INVENTION, according to the basic and the second inventions, the thermal efficiency can be improved by about 2 percent as compared with the conventional one because the primary air is at a high temperature under a high pressure and troubles such as dust adhered to the vanes of the primary air blower causing vibration are minimized since the electric precipitator is installed on the primary air line. Further, burning of any fragile section in the clinker box is protected by these heating tubes mounted on it. As a result, continuous operation for a long time is also possible, which helps to improve the overall thermal efficiency of a plant provided with a primary air supply unit according to the invention.

What is claimed is:

1. In combination, a rotary kiln,
a burner disposed at one end of said kiln,
means for supplying primary air under pressure to said burner,
a clinker box adjacent said end of said kiln for receiving clinker produced by said kiln,
said clinker box having a ceiling thereover,
means for passing secondary air into contact with said clinker prior to passing said secondary air into said end of said kiln,
at least one heating tube group disposed adjacent to said ceiling,
said heating tube group formed with a continuous passage having one end in communication with said burner and the other end in communication with said means for supplying said primary air to said burner whereby said primary air passes through said heating tube group in said clinker box and is preheated prior to passing into said burner.

2. The combination as defined in claim 1, wherein that portion of said ceiling of said clinker box adjacent said end of the kiln is turned upwardly toward said end of said kiln and spaced therefrom to form a corner, and
said heating tube group being disposed on said corner of said ceiling.

3. The combination as defined in claim 1 wherein said heating tube group disposed adjacent to said ceiling depends downwardly from said ceiling to form a partition across said clinker box.

4. The combination as defined in claim 1 wherein that portion of said ceiling of said clinker box adjacent said end of said kiln is turned upwardly toward said end of said kiln and spaced therefrom to form a corner,
a first heating tube group being disposed on said corner of said ceiling, a second heating tube group spaced from said first heating tube group extending downwardly from said ceiling, said first and second heating tube groups being in communication with each other whereby said primary air passes through said heating tube groups in said clinker box and is preheated prior to passing into said burner.

5. The combination as defined in claims 1, 2, 3 or 4 wherein said clinker box has a high temperature zone at one end thereof adjacent said end of said kiln and a low temperature zone at the other end of said clinker box,
an outlet in said low temperature zone of said clinker box for passage of a portion of said secondary air therethrough, and means for passing said portion of secondary air through said means for supplying said primary air through said burner and through at least one heating tube group for further heating prior to passing into said burner.

6. The combination as defined in claim 5 wherein said means for passing said portion of secondary air through said at least one heating tube group includes a dust precipitator for removing dust from said clinker box passing through said outlet.

* * * * *